US005351094A

United States Patent [19]
Washino

[11] Patent Number: 5,351,094
[45] Date of Patent: Sep. 27, 1994

[54] TELEVISION RECEIVER WITH SCAN VELOCITY MODULATION BEING ADJUSTED ACCORDING TO ASPECT RATIO

[75] Inventor: Takao Washino, Daito, Japan

[73] Assignee: Funai Electric Co., Ltd., Daito, Japan

[21] Appl. No.: 6,618

[22] Filed: Jan. 21, 1993

[51] Int. Cl.⁵ .................. H04N 3/32; H04N 5/46
[52] U.S. Cl. .................. 348/626; 348/571
[58] Field of Search .......... 358/230, 242, 166, 162; 348/571, 625, 626; H04N 5/46, 3/22, 3/32, 5/208

[56]  References Cited
U.S. PATENT DOCUMENTS

| | | | |
|---|---|---|---|
| 4,670,784 | 6/1987 | Goldberg | 358/242 |
| 4,760,455 | 7/1988 | Nagashima | 358/242 |
| 5,072,300 | 12/1991 | Anderson | 358/242 |
| 5,164,829 | 11/1992 | Wada | 358/166 |
| 5,193,006 | 3/1993 | Yamazaki | 358/242 |

FOREIGN PATENT DOCUMENTS

| | | | |
|---|---|---|---|
| 0206380 | 9/1986 | Japan | H04N 5/46 |
| 0104072 | 4/1990 | Japan | H04N 5/46 |
| 0108377 | 4/1990 | Japan | H04N 5/46 |
| 3262285 | 11/1991 | Japan | H04N 5/46 |
| 4127680 | 4/1992 | Japan | H04N 5/46 |

Primary Examiner—Mark R. Powell
Assistant Examiner—Chris Grant
Attorney, Agent, or Firm—Lackenbach Siegel Marzullo Aronson and Greenspan

[57]  ABSTRACT

In a high quality TV receiver and an oblong standard TV receiver, when a TV signal having a smaller aspect ratio than those receivers is received, ugly pictures due to ringings and the like are adapted not to appear on the CRT screen surface even if a velocity modulation circuit is provided. An input TV signal having a small aspect ratio is structured from an image conversion circuit which includes a scanning time proportionate to an increasing aspect ratio of the TV receiver and a velocity modulation switch circuit which controls the operation of a velocity modulation circuit 16.

6 Claims, 3 Drawing Sheets

TELEVISION RECEIVER WITH SCAN VELOCITY MODULATION BEING ADJUSTED ACCORDING TO ASPECT RATIO

BACKGROUND OF THE INVENTION

This invention relates to a television (hereafter referred to as "TV") receiver having a different aspect ratio which indicates a standard TV signal to a receiver having an oblong standard TV receiver and a high quality TV receiver.

In a high quality TV receiver which receives a signal from a high quality system (aspect ratio 16/9) and the present standard TV system (aspect ratio 4/3) having a different aspect ratio, the signal of the standard TV system is converted to the high quality TV system as a standard in the longitudinal length of the high quality TV CRT (cathode-ray tube) screen surface, thereby projecting the picture on the CRT surface in the state shown in FIG. 4, wherein the numeral 100 is a CRT screen surface having an aspect ratio larger than 4/3, such as in a high quality TV system, 101 is a picture surface area corresponding to the standard TV CRT, portions 102, 103 have no image signals from converted TV and areas where the images are not projected thereon respectively, and 102e, 103e are boundary line parts of the above area.

On the other hand, with the oblong standard TV receiver, although there is no need for the conversion of the above TV system signal, the image is projected on the screen surface in the state shown in FIG. 4. When the present standard TV signal is projected to the above high quality TV receiver or the oblong standard TV receiver, the following problems are caused beyond the boundary line portions 102e, 103e on both the right and left ends of the image surface 101.

As a conventional prior art for solving the above problems, patent publication No. Heisei 2 (1990) - 237282, "High Quality TV Receiver" is known.

In addition, as a patent wherein a velocity modulation circuit is used, the following is proposed.

The so-called use of a velocity modulation circuit, wherein a magnetic field in a horizontal direction is proportional to the amount of change (a differential amount) of a luminance signal each time during each horizontal scanning to increase the sharpness of the image, is piled on a horizontal deflection magnetic field whereby the horizontal scanning velocity is adapted to change to a speed higher or lower than the standard at the front or the rear portion where the luminance is subjected to change.

A conventional example wherein a velocity modulation circuit is used for a high quality TV receiver, is shown in FIG. 3.

In this case, the numeral 11 is an input terminal of a standard TV signal, 12 is a signal conversion circuit which converts the standard TV signal to the high quality TV signal, 12a is an output terminal of the luminance signal, 14 is a high quality TV receiver, 14a is an image signal treatment circuit, 14b is a CRT, 14c is a cathode, 14d is a grid electrode, 14e and 14f are a horizontal and a vertical deflection coil, respectively, 16 is a velocity modulation circuit, and 17 is a velocity modulation coil.

The output of the luminance signal generated at the above signal conversion circuit 12 or the image signal treatment circuit 14a is sent to the velocity modulation circuit 16, where the output is adapted to be sent to the velocity modulation coil 17 in a current output form which varies the horizontal scanning velocity to a velocity higher or lower than the standard one at the front or the rear portion of the luminance change. In this way, the image becomes sharper.

However, at the boundary lines 102e and 103e shown in FIG. 4, the velocity modulation circuit 16 causes a large change of the luminance signal, which causes ringings at the boundary line portions 102e and 103e of the CRT screen surface, and the picture consequently becomes glittered and ugly.

The object of this invention is to do away with the above problems and to provide a TV receiver having a velocity modulation circuit effect without such glittered and ugly images due to the ringing on the screen surface of the CRT indicator, even if the velocity modulation circuit is provided thereto, when the standard TV signal having a smaller aspect ratio is received by the high quality TV receiver or the oblong standard TV receiver.

BRIEF DESCRIPTION OF THE INVENTION

In order to solve the above problems, this invention is characterized in that in a TV signal receiver having a different aspect ratio, when a received image having a different aspect ratio from the inherent aspect ratio of the receiver is regenerated on the screen surface of the TV receiver, in the TV receiver which forms dark color level images at both ends of the screen surface, a velocity modulation of the scanning velocity of an electron beam is off at a boundary portion between the received picture and the dark level image of the TV signal.

Further, the TV receiver is characterized in that;

an image conversion means wherein the aspect ratio of the CRT screen surface of the above receiver compresses each horizontal period scanning time of the input TV signal proportionately as increasing ratio thereby outputs a conversion image signal plus a dark level image signal corresponding to a compressed time to the front and rear of each compressed image signal, and generates the luminance signal of the conversion image signal, and generation of a control signal from a time wherein a fixed time is added to said compressed image signal of said each horizontal period scanning time to a time which subtracts a fixed time from the completed time of said compressed image signal; and a velocity modulation circuit and a velocity modulation coil which generate a horizontal magnetic field for CRT electron beam scanning which improves the sharpness of the image; and a velocity modulation switch circuit which passes said luminance signal generated from said image conversion means during the period wherein a control signal generates from the same means; and where said input TV signal system is different from a TV signal system of said TV receiver, the input TV signal is input into said image converted means after being converted into the TV signal system of said TV receiver.

When a TV receiver such as the oblong standard TV receiver coincides with the input TV signal system and the TV signal having a small aspect ratio is received, the TV signal thereof compresses the horizontal period scanning time in reverse as increasing value of the aspect ratio by means of the image conversion, and a conversion of the image signal plus the black level signal corresponds to the compression time the front or the rear is sent to the image treatment circuit.

On the other hand, the luminance signal caused by the image conversion means is sent to the velocity modulation circuit and the current then flows to the velocity modulation coil. Since the above velocity modulation circuit operates by the control signal generated at the same time by the image conversion means, the velocity modulation circuit near the boundary line portions of the right and left ends of the compressed image where the change of the luminance signals is large might not operate.

Further, when a TV receiver such as the high quality TV receiver receives a TV signal having a small aspect ratio different from the input TV signal, the input TV signal is converted into the TV signal system and then input to the above image conversion means.

Figure 1:
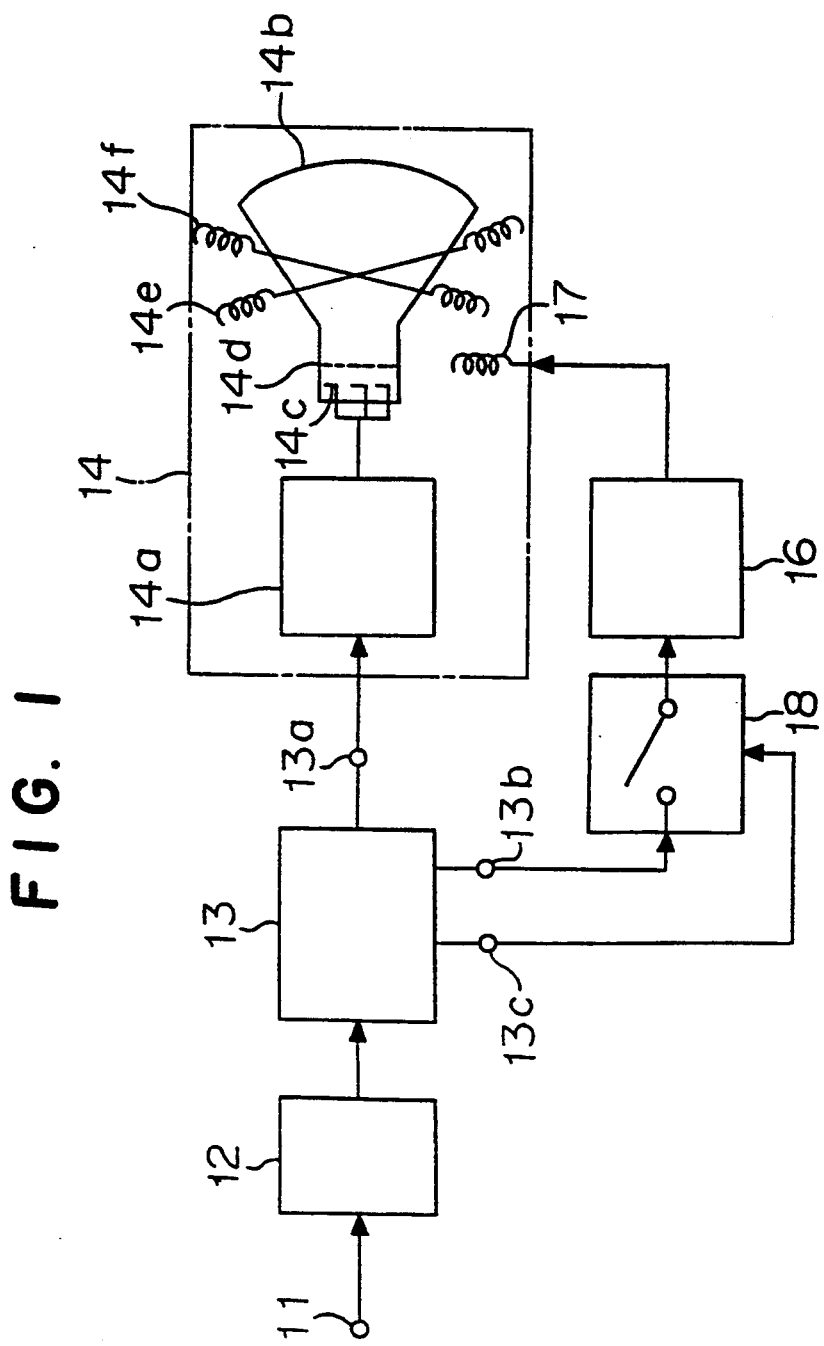
FIG. 1 is a block diagram of an embodiment of this invention.

Further, the following numerals represent the following unit:

11: standard TV input terminal
12: signal conversion circuit
13: image conversion means
13a: output terminal of a conversion image signal
13b: luminance signal output terminal
13c: controlled signal output terminal
14: high quality TV receiver
16: velocity modulation circuit
17: velocity modulation coil
18: velocity modulation switch circuit

DETAILED DESCRIPTION OF THE INVENTION

Figure 3:
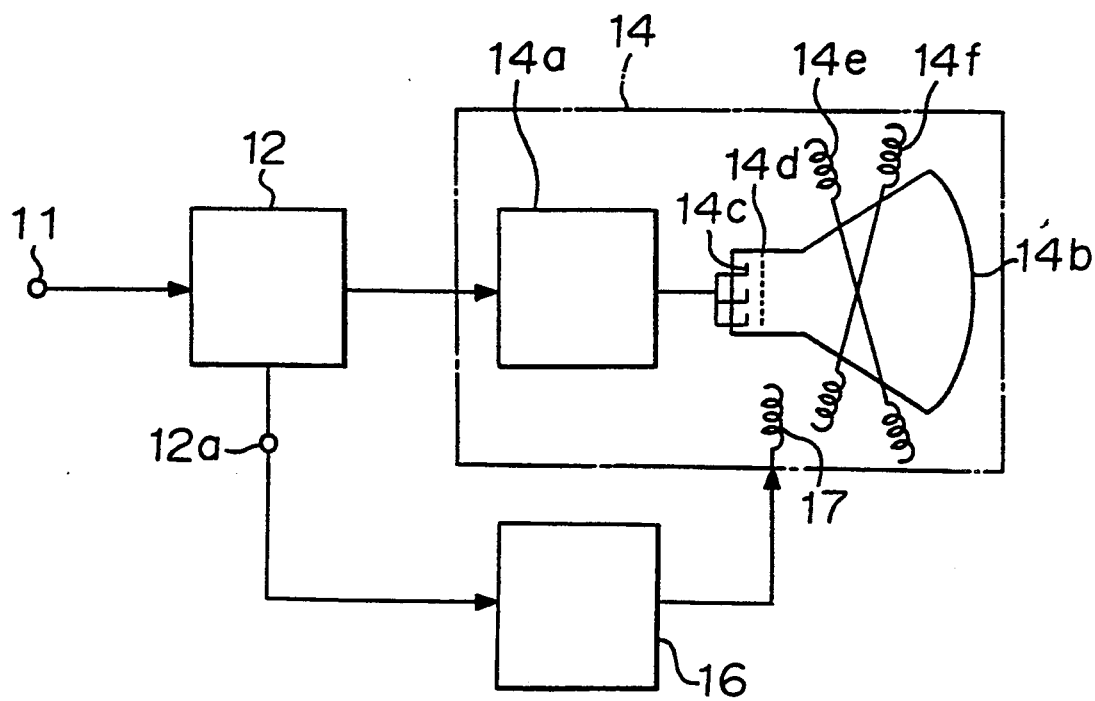
FIG. 3 is a block diagram of a conventional example.
Figure 4:
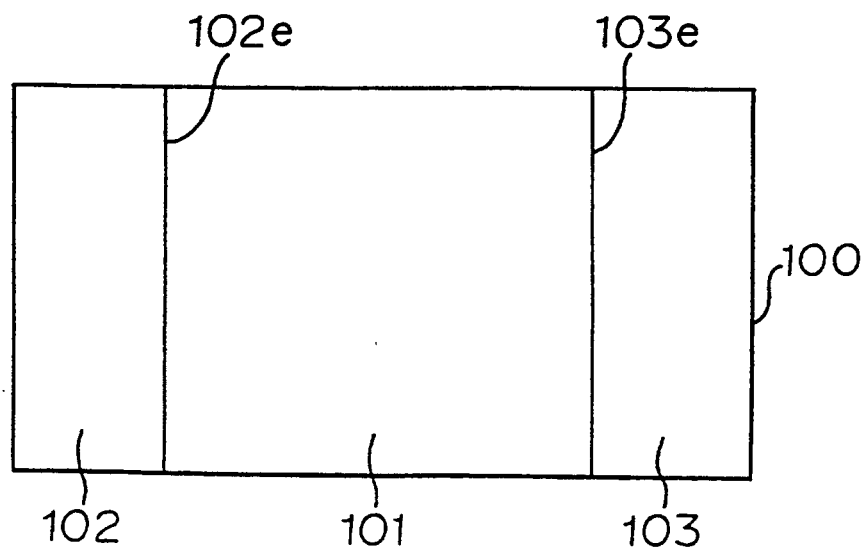
FIG. 4 is an explanation view which shows the areas where the image signal is not projected on both ends of the screen surface.

FIG. 1 shows a block diagram of an embodiment, wherein the numerals 11, 12, 14, 14a-14f, 16 and 17 are the same as in FIG. 3.

The numeral 13 is an image conversion means, 13a is an output terminal of a conversion image signal, 13b is a luminance signal output terminal and 13c is a controlled signal output terminal.

The numeral 18 is a velocity modulation switch circuit.

The operation is as follows: the standard TV signal is converted into the high quality TV signal at the signal conversion circuit 12. Then, each horizontal period scanning time is compressed at the ratio of (4/3)/(16/9) by the image conversion means 13, and a converted image signal plus a black level (dark level) image corresponding to the compressed time at the front and rear is input to the high quality TV receiver 14 through the output terminal 13a.

On the other hand, the luminance signal converting the image through the luminance signal output terminal 13b of the image conversion means 13 is input into the velocity modulation switch circuit 18. At the velocity modulation switch circuit 18, the controlled signal is output to the output signal terminal 13c by the above image conversion means to control the operation of the velocity modulation switch circuit 18. The above control signal is a large part of varied amounts of the luminance signal near the boundary portions 102e, 103e at both right and left ends on the compressed image, and since the velocity modulation switch circuit 18 is kept OFF, the ringings at the boundary portions 102e, 103e do not occur.

Figure 2:
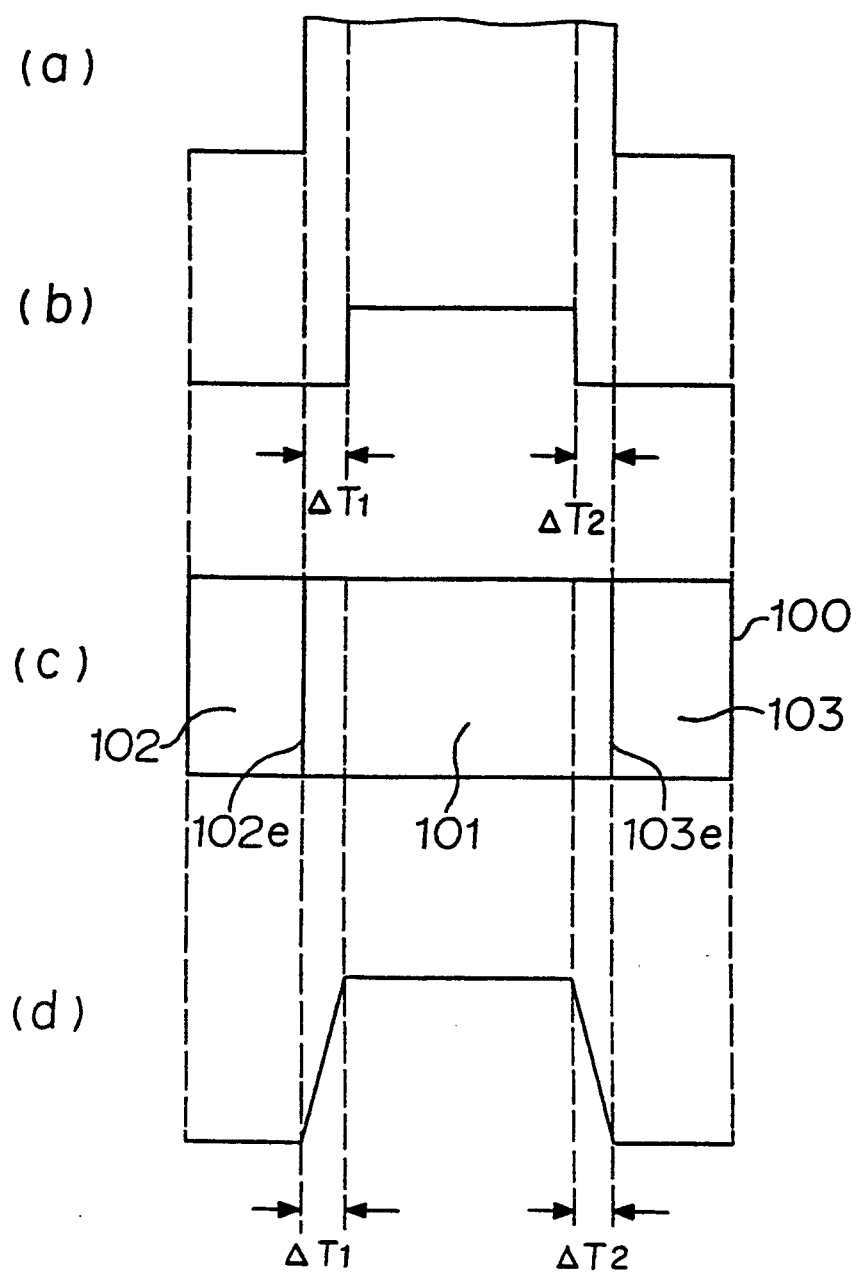
FIG. 2 is a timing diagram of a controlled signal to the velocity modulation switch circuit in this invention.

FIG. 2 shows the relation between the luminance signal "a" and the control signal "b", and the screen surface "c" of the TV receiver. Generation of the control signal smaller than the compressed time by $\Delta T_1$, $\Delta T_2$ in the scanning time is adapted to be obtained.

In addition, instead of the control signal "b" in FIG. 2, a control signal "d" which increases or decreases the output current of the velocity modulation circuit which proportionates to an analog value may be used.

The embodiment in FIG. 1 shows where the input TV signal is different from the TV signal system of the TV receiver, but in the same case there is no need for the signal conversion circuit 12 of FIG. 1. The same case is one where the input is a standard TV signal and the TV receiver is an oblong standard TV receiver.

When the standard TV signal having a smaller aspect ratio is received by the high quality TV receiver or the oblong standard TV receiver, an ugly picture due to the ringings does not appear on the screen surface of the CRT indicator even if the velocity modulation circuit is provided, and it becomes a TV receiver having a velocity modulation circuit effect.

What I claim is:

1. A TV signal receiver which comprises:
    an image conversion means for compressing each horizontal period scanning time of an input TV signal proportionately to the increasing ratio of an aspect ratio of a CRT screen surface in said TV receiver, supplying a converted compressed image signal plus dark level image signal corresponding to a compressed time at front and rear portions of each said compressed image signal, and generating a luminance signal of said converted image signal and a control signal from a time wherein a first fixed time is added to said compressed image signal of said each horizontal periodic scanning time to a time which reduces a second fixed time from the completed time of said compressed image signal;
    a velocity modulation circuit and a velocity modulation coil connected to an output of said velocity modulation circuit, said velocity modulation coil generating a horizontal magnetic field for CRT electron beam scanning which improves the sharpness of the image; and
    a velocity modulation switch circuit between said image conversion means and said velocity modulation circuit which transmits said luminance signal generated from said image conversion means to said velocity modulation circuit during the period wherein a control signal is generated by said image conversion means, whereby
    said input TV signal system may have a different aspect ratio from a TV signal system of said TV receiver, the input TV signal is input into said image conversion means after being converted into the TV signal system of said TV receiver.

2. A receiver as defined in claim 1, further comprising a signal conversion means having an output connected to an input of said image conversion means for converting a standard TV signal to a high quality TV signal which is inputted to said image conversion means.

3. A receiver as defined in claim 1, wherein the receiver includes vertical and horizontal CRT electron beam deflection coils in addition to said velocity modulation coil.

4. A receiver as defined in claim 1, wherein said velocity modulation switch circuit is actuated when said control signal attains a predetermined amplitude, and said image conversion means includes means for delaying said control signal an interval $\Delta T_1$ past said front portion before attaining said predetermined amplitude and for reducing the amplitude of said control signal below said predetermined amplitude an interval $\Delta T_2$ prior to said rear portion.

5. A receiver as defined in claim 4, wherein said control signal is a rectangular wave with a positive step to said predetermined amplitude $\Delta T_1$ after said front portion and a negative step $\Delta T_2$ prior to said rear portion.

6. A receiver as defined in claim 4, wherein said control signal is gradually increased to said predetermined amplitude in interval $\Delta T_1$ and is gradually decreased in the interval $\Delta T_2$.

* * * * *